No. 12,418. REISSUED DEC. 12, 1905.

J. W. BOILEAU.

PULVERIZER.

APPLICATION FILED NOV. 21, 1904.

3 SHEETS—SHEET 1.

Witnesses
Edward D. Cult
H. C. Smith

Inventor
James W. Boileau
By James Whittemore
Atty.

No. 12,418. REISSUED DEC. 12, 1905.

J. W. BOILEAU.

PULVERIZER.

APPLICATION FILED NOV. 21, 1904.

3 SHEETS—SHEET 2.

Witnesses
Edward D. Luft
H. C. Smith

Inventor:
James W. Boileau
By James Whittemore
Atty

No. 12,418. REISSUED DEC. 12, 1905.

J. W. BOILEAU.

PULVERIZER.

APPLICATION FILED NOV. 21. 1904.

3 SHEETS—SHEET 3.

Witnesses
Edward D. Gult
H. E. Smith

Inventor:
James W. Boileau
By James W. Whittemore
Atty.

UNITED STATES PATENT OFFICE.

JAMES W. BOILEAU, OF DETROIT, MICHIGAN, ASSIGNOR TO LOUIS C. SHERWOOD, TRUSTEE, OF DETROIT, MICHIGAN.

PULVERIZER.

No. 12,418. Specification of Reissued Letters Patent. Reissued Dec. 12, 1905.

Original No. 764,268, dated July 5, 1904. Application for reissue filed November 21, 1904. Serial No. 233,745.

*To all whom it may concern:*

Be it known that I, JAMES W. BOILEAU, a citizen of the United States of America, residing at Detroit, in the county of Wayne and State of Michigan, have invented certain new and useful Improvements in Pulverizers, of which the following is a specification, reference being had therein to the accompanying drawings.

My invention provides in one apparatus means whereby rock, bone, cereals, and the like may be pulverized to any degree of fineness and means whereby the product may be sized and graded. The pulverization I accomplish by means of currents of air generated by rapidly-revolving blades and meeting at different angles. The particles of matter to be treated are carried by the opposing air-currents violently into and against other particles and by the force of the impact is disintegrated. The grading is done by another auxiliary air-current, which carries the pulverized product in suspension over a series of compartments, into which the product is deposited according to relative size.

In the accompanying drawings I have illustrated a preferred form of my apparatus, in which—

Figure 1:
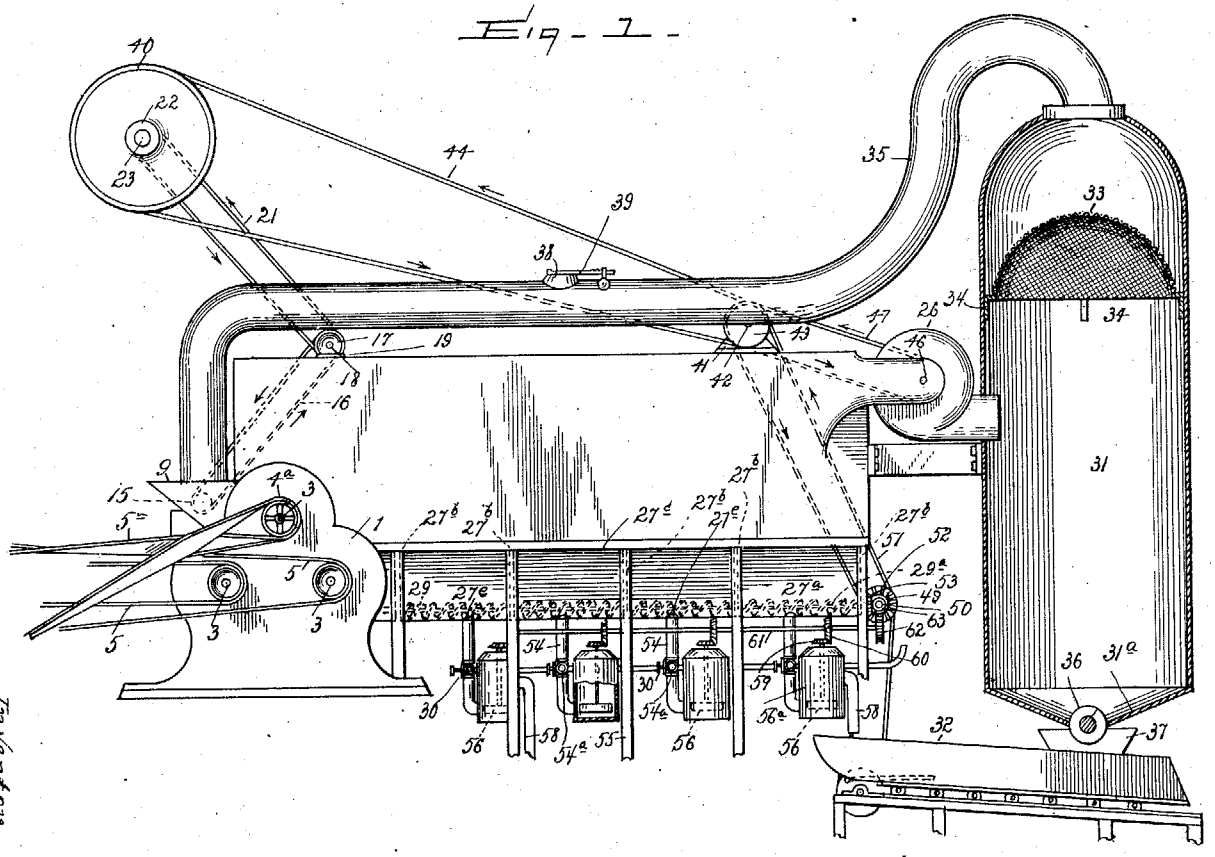
Figure 5:
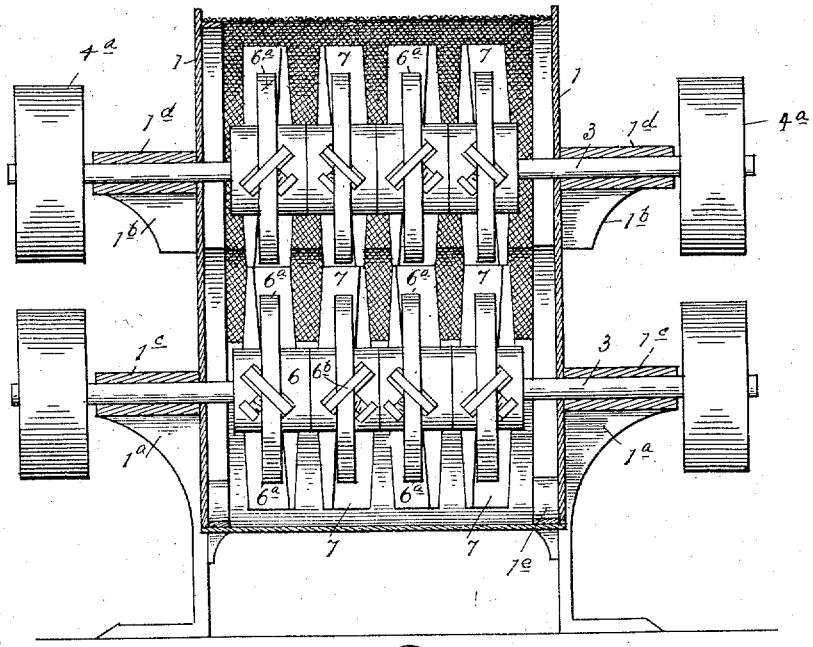
Figure 6:
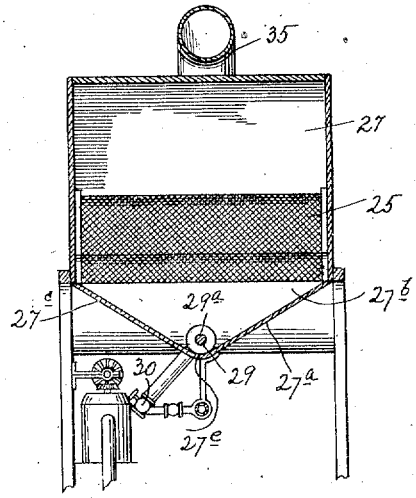
Figure 4:
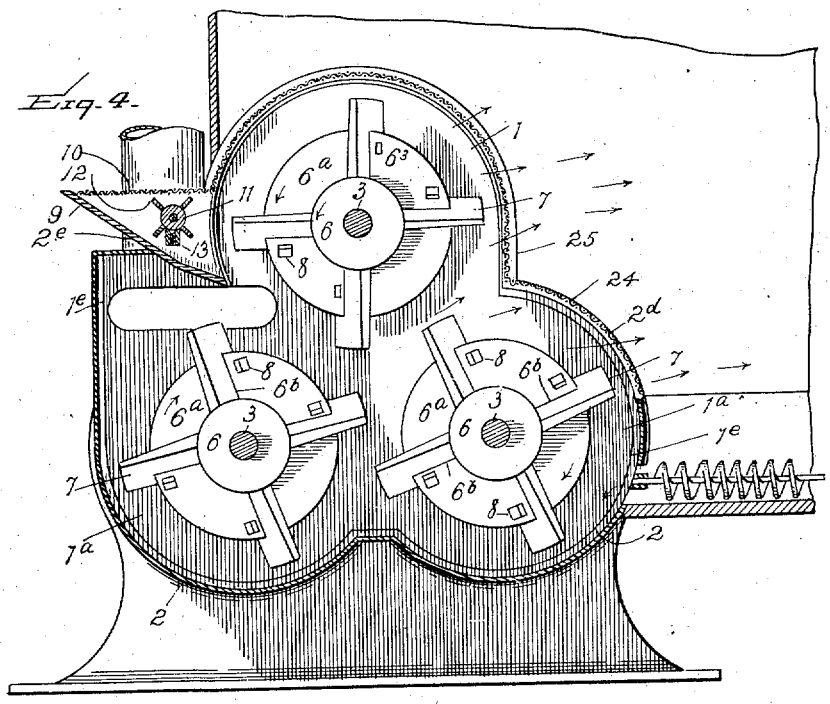
Figure 5:
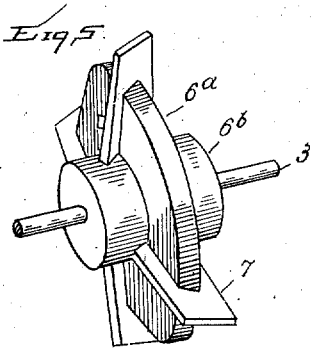
Figure 6:
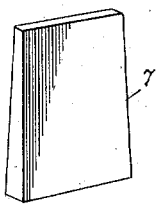

Figure 1 is a side elevation of the plant, the grading portion being shown in section. Fig. 2 is a vertical section of the pulverizer. Fig. 3 is a vertical transverse section of the grading-chamber. Fig. 4 is a vertical section of the pulverizer, taken at right angles to Fig. 2. Fig. 5 is one of the pulverizing-wheels, and Fig. 6 is one of the blades removed from the wheel.

The pulverizer-casing is composed of end plates 1 and cover 2. Mounted thereon are brackets $1^a$ and $1^b$ and shaft-bearings $1^c$ and $1^d$, supporting shafts 3, each carrying a series of pulverizing-wheels. While I have shown three shafts, each carrying four wheels, the number of each may vary, the relative location of the shafts and the shape of the casings being changed to accord. In the shafts are mounted pulleys 4 and $4^a$, driven by independent belts 5 and $5^a$, so that one or more of the shafts may be thrown out of operation without interfering with the others. The belts are preferably arranged so as to drive the contiguous shafts in the same direction.

Each pulverizing-wheel in the series comprises a hub 6 and a central disk $6^a$. Each disk is provided with a plurality of equally-spaced slots $6^b$, extending through the same diagonally in alternate directions, but each at an angle of preferably forty-five degrees, through the plane of the disk, though this angle may be varied somewhat to suit the material under treatment. These slots are larger at their inner ends, so as to be tapering and to cause the wedge-shaped blades 7 to be the more firmly held therein by centrifugal force when in operation. The blades are secured against lateral displacement by set-screws 8. The blades extend beyond the circumference of the disk, and each blade being at right angles to the preceding one they form a zigzag periphery for the wheel. The wheels on each shaft are also relatively disposed, so that the blades on adjoining wheels will be at right angles to each other, thus presenting zigzag lines of pulverizing edges as viewed lengthwise of the shaft.

The shafts are so spaced apart that the wheels will rotate freely without interference with the wheels on the other shafts, the different series running clear.

The feed-hopper 9 is provided with the grizzly 10 to prevent the entry of large pieces of matter. It contains the feed-roller 11, having agitating-arms 12 and mounted on springs 13 in bearings. This roller is operated by the pulley 15, driven by belt 16 from pulley 17 on shaft 18 in the bracket 19 by the belt 21 from the pulley 22 on power-shaft 23. The feed-roller is so arranged as to feed the matter evenly and prevent the entrance of air in any considerable quantity.

On the opposite side of the pulverizing-chamber is the discharge-opening $2^d$, covered by the grizzly 24 and screen 25, through which the pulverized product is drawn by an air-current induced by the fan 26 into the grading-chamber 27.

The grading-chamber is oblong and has a sloping bottom $27^a$, divided by the transverse ribs $27^b$ into compartments $27^c$. Centrally of the bottom extends the screw conveyer 29. In each of the compartments below the conveyer is an outlet $27^e$, controlled by valves 30.

The very finely pulverized product is not deposited in the compartments of the grading-chamber, but is carried by the exhaust-current into the settling-chamber 31, where it is deposited in the sloping bottom 31[a] and removed by the conveyer 36 into the bin 37 for further treatment or to be utilized as desired.

The fan 26 produces a constant forced draft out of the pulverizing-chamber into the grading-chamber, into the settling-chamber, through the screen 33 on the brackets 34, and thence through the flue 35 back into the pulverizer through the opening 1[e], and thus in cycle. On the flue 35 is located the vent 38 and the valve 39, regulating the pressure in the flue.

The power-shaft 23 carries the pulley 40, communicating by belt 44 with the intermediate pulley 43, thence by belt 47 with the fan-shaft 46, and also by belt 51 with the pulley 49 on the shaft 50. The shaft 50 also carries the bevel-gear 53, operating the shaft 29[a] of the conveyer 29.

Connected with the outlets 27[e] by the pipes 54, containing the valves 54[a], is a series of mixing-chambers 55, containing paddles 56 for mixing the product with water admitted from a suitable water-supply preparatory to concentration or amalgamation. The paddles 56 are mounted on the shafts 56[a] and connected by intermediate gearing with the shaft 50.

In operation the pulverizing-wheels are caused to rotate at a speed approximating one thousand two hundred to two thousand revolutions per minute, thus creating violent air-currents running from one wheel into another and from one series into another. These air-currents are alternately convergent and divergent, both in longitudinal and circular series, so that each pair of currents traversing any portion of the casing is followed by a pair of currents of the opposite character. The matter to be pulverized is fed into the pulverizing-chamber by the feed-roller. By the pairs of convergent and divergent oblique blades the air and material are continually subdivided into masses which are flung laterally with violence against each other and are then as violently redivided and dashed together in the opposite direction. Each series of blades upon the same axis thus constitutes a beater, and this term will be employed in the claims to designate the same. When sufficiently reduced to pass through the screen 25, which may be approximately of twenty to thirty mesh, the pulverized product is carried by the exhaust-current into the grading-chamber. Here the larger particles are deposited in the compartments nearest the pulverizer and the relatively small particles in the compartments farther on, while the extremely fine dust is carried by the draft through into the settling-chamber, where it is caused to settle and is disposed of as stated.

The mesh of the screen 25 and the speed of the exhaust-fan 26 will be regulated according to the degree of fineness to which it is desired to carry the pulverization and the size desired to be carried into the settling-chamber by the draft. The more violent the exhaust the larger the particles carried past the grading-chamber without deposit.

The product deposited in the compartment nearest the pulverizer or in any other of the compartments may be returned at will by the conveyer 29 to the pulverizer for further treatment, or by opening the outlets 27[e] the product may be withdrawn, as stated.

Having thus fully described my invention, what I claim as new, and desire to secure by Letters Patent, is—

1. A pulverizer-wheel comprising a disk having radial blades extending from a point near the hub thereof and projecting obliquely on each side of the disk, said blades having their obliquity alternately reversed.

2. A pulverizer-wheel comprising a disk having blades extending therethrough at an angle of approximately forty-five degrees to the axis of the wheel and with the blades cutting the plane of the disk and extending on either side thereof with their inner ends abutting the hub of the disk.

3. A pulverizer-wheel comprising a wheel having blades removably secured therein and extending therethrough in planes at an angle of approximately forty-five degrees to the axis of the wheel, the blades extending beyond the plane of the disk on either side thereof throughout their length and with their inner ends abutting the hub of the disk.

4. A pulverizer-wheel comprising a disk having peripheral blades with enlarged inner ends located near the hub of the disk, said blades fitted in tapering openings and projecting obliquely through and beyond the face and periphery of the disk at an angle of approximately forty-five degrees to the axis of the wheel and adapted to be firmly held in place by the centrifugal force of the wheel when in operation.

5. A pulverizing-wheel comprising a disk having radial openings or slots extending from a point near the hub thereof toward the periphery and obliquely through the disk at an angle to the plane thereof, blades secured within the slots and projecting on each side of the disk, said blades having their obliquity alternately reversed.

6. A pulverizer-wheel comprising a wheel having radial tapering slots extending from a point near the hub of the disk to its periphery and obliquely through the disk at an angle of approximately forty-five degrees to the plane thereof, tapering blades fitted within and removably secured in the openings, the blades projecting beyond the periphery and on each side of the disk and being disposed alternately at an angle of approximately ninety degrees to each other.

7. A pulverizer having a series of wheels on a common shaft, each wheel comprising a disk carrying blades disposed at an angle to the plane of the disk and alternately at an angle to each other so as to present a zigzag periphery to the wheel, the blades being arranged on the shaft so that the blades of adjoining disks may be disposed at approximately the same radial distance from the shaft and at an angle to each other and present a zigzag line as viewed lengthwise of the series.

8. A pulverizer having a series of wheels on a common shaft, each wheel comprising a disk carrying blades disposed at an angle of approximately forty-five degrees to the plane of the disk and alternately at an angle of approximately ninety degrees to each other so as to present a zigzag periphery to the wheel, the wheels being arranged on the shaft so that the blades of adjoining disks will be disposed at approximately the same radial distance from the shaft and at an angle of approximately ninety degrees to each other and present a zigzag line of pulverizing edges as viewed lengthwise of the series.

9. A pulverizer comprising a plurality of shafts, each shaft having mounted thereon a series of pulverizing-wheels each wheel consisting of a disk having radial openings or slots extending from a point near the hub thereof toward the periphery and obliquely through the disk at an angle to the plane thereof, blades secured within the slots, said blades being disposed in intersecting planes, the blades of adjoining wheels in each series disposed at an angle to each other so as to present a zigzag line as viewed lengthwise of the series, the several shafts so relatively arranged that the periphery of one series of wheels will not intermesh with the periphery of another series.

10. A pulverizer comprising a plurality of shafts, each shaft having mounted thereon a series of pulverizing-wheels, each wheel consisting of a disk provided with radial openings extending obliquely through the disk in opposite directions alternately at an angle of approximately forty-five degrees to the plane of the disk and ninety degrees to each other, blades removably secured within the openings with their inner ends approaching the hub and with their outer ends extending beyond the periphery of the disk, the blades of adjoining wheels in each series disposed at approximately ninety degrees to each other so as to present a zigzag line of pulverizing edges as viewed lengthwise of the series, the several shafts so relatively arranged parallel that the periphery of one series of wheels will not intermesh with the periphery of another series.

11. In a pulverizer, the combination of an inclosing casing formed with a feed-inlet and a rotating series of pairs of oppositely-angling blades mounted within said casing, the blades of successive pairs being alternately convergent and divergent, whereby in their rotation the material under reduction is alternately divided and forcibly flung together.

12. In a pulverizer, the combination of an inclosing casing formed with a feed-inlet and a series of rows of alternately oppositely angling pairs of blades mounted in said casing, the corresponding blades in successive rows which pass through the same path being oppositely inclined, whereby in the rotation thereof the material under reduction is alternately divided and forcibly flung together.

13. In a pulverizer the combination of an inclosing casing formed with a feed-opening, a plurality of adjacent rotary beaters, each comprising a rotating series of pairs of adjacent oppositely-angling blades, the blades of successive pairs on the same axis being alternately convergent and divergent, means for rotating said beaters so that their adjacent peripheral portions are traveling in opposite directions, and means for delivering the material under reduction into the space between said beaters, whereby it is alternately divided and forcibly flung together by the conjoint action of said beaters.

14. In a pulverizer the combination of an inclosing casing provided with a feed-opening therein, three adjacent rotary beaters therein, each comprising a rotating series of pairs of adjacent oppositely-angling blades, the blades of successive pairs being alternately convergent and divergent, the axes of two of said beaters being in substantially the same horizontal plane, and the axis of the third being arranged above and between the axes of the others, whereby the peripheries of said beaters form therebetween a substantially triangular pocket, means for rotating said beaters so that the adjacent peripheral portions of the lower members are traveling in opposite directions, and the adjacent peripheral portion of the lower and upper members are traveling in the same direction, and means for delivering the material under reduction between the upper and lower beaters in their direction of rotation.

In testimony whereof I sign this specification in the presence of two witnesses.

JAMES W. BOILEAU.

Witnesses:

ED. D. AULT,

H. C. SMITH.